United States Patent Office 2,915,480
Patented Dec. 1, 1959

2,915,480

AZIRIDINE-CARBOXYLIC ACID POLYMERS

Wilson A. Reeves and George L. Drake, Jr., Metairie, and John D. Guthrie, New Orleans, La., assignors to the United States of America as represented by the Secretary of Agriculture No Drawing. Application December 4, 1956
Serial No. 626,272

15 Claims. (Cl. 260—2)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to new synthetic polymers, processes for their production and processes of employing these polymers. These new materials are especially suitable for use in the plastics and coating arts and for application to textiles.

In general this invention relates to polymers capable of being produced by the reaction of compounds which contain two or more 1-aziridinyl groups,

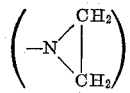

attached directly to non-metallic atoms with compounds which contain one or more carboxylic acid groups

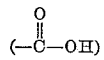

It is an objective of the present invention to prepare a new class of synthetic materials, more particularly resinous compositions, which have particular utility in the plastics and coating arts e.g. as laminating, impregnating, adhesive, coating, as textile and paper treating materials and as molding compositions. Other objectives of the invention will be apparent to those skilled in the art as the description of the invention proceeds.

We have discovered that compounds which contain two or more 1-aziridinyl groups attached directly to a non-metallic atom react with compounds that contain one or more carboxylic acid groups to produce polymers. Such polymers contain the characteristic reoccurring connecting structures,

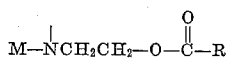

and

wherein M is a non-metal of the group P and S and wherein R is an alkyl or aryl group.

Such polymers can be produced in the form of liquids or solid synthetic resins. They are flame resistant and when deposited in the interstices of hydrophilic fibrous organic materials, they reduce the flammability of such products. When deposited as surface coatings on non-hydrophilic materials, they form flame-resistant coatings.

1-Aziridinyl compounds siutable for use in the invention are compounds that contain the following structures:

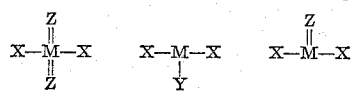

and

where Z is oxygen, sulfur or nitrogen; X is

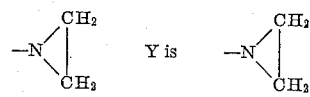

a dialkyl amine, an alkyl, an alkylene or an aryl group; M is phosphorus or sulfur. Some typical examples of compounds are:

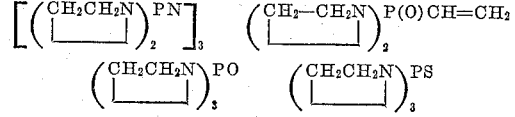

and

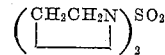

These 1-aziridinyl compounds can be prepared by substantially any of the known processes for producing such compounds. In general, they are prepared by reacting ethylenimine or carbon substituted ethylenimines with the corresponding non-metallic halide in the presence of an acid acceptor such as trimethyl amine.

Carboxylic acids suitable for use in this invention include substantially any compound or polymer that contains one or more carboxylic acid groups. Both substituted and non-substituted aromatic and aliphatic carboxylic acids are useful. Some specific carboxylic acids that can be used in practicing the present invention are given below:

Acetic acid
Perfluoroacetic acid
Propionic acid
Beta-bromopropionic acid
Stearic acid
Oxalic acid
Adipic acid
Malonic acid
Succinic acid
Vinyl acetic acid
Eleostearic acid
Benzoic acid
Bromobenzoic acid
Tere-phthalic acid
Chlorendic acid
N,N,N'N'-tetracarboxymethyl ethylenediamine
Citric acid
Aconitic acid The invention is not limited to the use of these carboxylic acids. The carboxylic acid may contain other functional groups such as those in salicylic acid and glyoxylic acid. Perfluoro carboxylic acids are useful reagents in the production of flame and oil resistant polymers.

The proportions of reactants can be varied widely depending, for example, upon the particular properties desired in the final product. The amount of carboxylic acid used may be only about 2% of the amount of aziridinyl compound used or it may be a much greater proportion. For example, the properties of carboxymethylcellulose may be markedly changed by reacting as little as 2% tris(1-aziridinyl)phosphine sulfide with it. Carboxylic acids enter the reaction with aziridinyl compounds almost quantitatively when they are used in quantities not to exceed about one carboxy group per aziridinyl group.

The reaction can be carried out with or without a solvent. If both the acid and aziridinyl compounds are solids they can be fused together; if either the acid or aziridinyl compound is a liquid at room temperature, the solid component may be dissolved in the liquid component. In many cases it is preferable to carry out the reaction in a solvent. Suitable solvents include water and most common organic solvents that dissolve the reactants. Water, acetone, benzene, and ethanol have been found to be especially good solvents. Although ethanol and other alcohols react with both the aziridinyl compounds and with carboxylic acids, the reaction of 1-aziridinyl compounds with carboxylic acids is much faster at a given temperature, therefore, the reaction may be carried out in alcoholic solvents with only slight modification of the aziridine-carboxylic acid polymer.

The temperature of the reaction can be varied depending, for example, upon the particular reactants employed, the rapidity of reaction wanted, the particular properties desired in the reaction product, and other factors. For example, oxalic acid reacts with tris(1-aziridinyl) phosphine sulfide very rapidly at 20° C. whereas adipic acid reacts slowly with the same aziridinyl compound at 70° C. In general, the polymers described in this invention are prepared at a temperature ranging from about 10° C. up to about 150° C.

The following examples are given by way of illustration and not by way of limitation of this invention. All parts and percentages are by weight. For convenience the compound, tris(1-aziridinyl)phosphine sulfide and tris(1-aziridinyl)phosphine oxide are referred to as APS and APO respectively.

*Example 1*

Polymerization of acetic acid and APS.

Five parts of APS was dissolved in 25 parts of water. Three parts of acetic acid was added to the solution at 30° C. while it was stirred. A clear solution first formed then after about 1 minute it became turbid then a mealy white insoluble resin was deposited. The amount of resin deposited accounted for most of the APS and acetic acid used. The resin would not support combustion.

A very similar resin was made by duplicating the above conditions except that beta-bromopropionic acid was used instead of acetic acid.

*Example 2*

Bulk polymerization of adipic acid and APS.

Three parts of adipic acid was stirred into 3 parts of melted APS. The adipic acid dissolved to form a clear solution. The solution was kept at 40–50° C. and within about 1 minute polymerization had reached the gel state. A clear hard resin was produced by allowing the gel to set at 27° C. for a few hours. The resin contained phosphorus and nitrogen and was highly flame resistant. The clear solution described above is useful in making flame-resistant molded objects.

*Example 3*

Reaction of adipic acid with APS and with APO.

Four parts of adipic acid was dissolved in 25 parts of acetone then 4 parts of APS dissolved in 10 parts of acetone was added to the adipic acid solution. The combined solution was heated on a steam bath to slowly distill the solvent. The temperature of the solution remained at about 65° C. until about 80 to 90% of the acetone had distilled which required about 10 minutes. The temperature then began to rise and when it was at 70° C., the steam heat was reduced so that the temperature would not go higher than about 70° C. It was kept at this temperature for 2 to 3 minutes then cooled to 27° C. It was a very viscous, clear syrup. A portion of the syrup was placed in a thin layer on a glass plate and heated 10 minutes on steam cone at about 70–80° C. to produce a clear gel.

The remainder of the syrup was allowed to stand at 27° C. for 16 hours. It formed a clear, tough resin that was insoluble in water and in acetone. The resin was pulverized and extracted with water and ethanol. The extracted resin contained 7.56% phosphorus and 10.23% nitrogen and would not support a flame. The yield of extracted resin was 91% based upon the amount of APS and adipic acid used.

An experiment similar to the one described above was run in which APO was used instead of APS; the solvent and procedure was the same. The product was also similar to that described above; the portion that polymerized at 27° C. for 16 hours was a clear tough resin. It contained 8.33% phosphorus and 11.0% nitrogen. The resin would not support combustion. The yield of this resin was 96%.

*Example 4*

Reaction of oxalic acid with APS.

About 3 parts of oxalic acid was dissolved in a minimum of water at 27° C. Then 3 parts of APS was dissolved in water and added to the oxalic acid solution. Polymerization occurred almost immediately to produce a white mealy product which was insoluble in water and organic solvents. The polymer would not support a flame. The polymer was resistant to short periods of heat at 140° C. but became yellow when heated 4 hours at 140° C.

*Example 5*

Reaction of succinic acid with APS.

Three parts of succinic acid was dissolved in a minimum of water at 70° C. then 3 parts of APS was dissolved in the hot solution. Within 30 seconds a precipitate began to come down and apparently had ceased after about 3 minutes. The product was an insoluble polymer. It contained sulfur and phosphorus and would not support a flame.

*Example 6*

Reaction of itaconic acid with APS.

Four parts of itaconic acid, $HOOCC(:CH_2)CH_2COOH$ was dissolved in 20 parts of 95% ethanol then 4 parts of APS was dissolved to form a clear solution. A portion of the solution was used to pad 8 oz. cotton twill fabric. The wet fabric was dried by heating for 5 minutes at 120° C. It was then rinsed in water and air dried. The treated fabric was flame resistant. The remaining solution was placed on a steam bath at about 70° C. Within 30 minutes the entire mass was a clear gel. The gel was insoluble in water and in ethanol. When the gel was heated at 110° C. for one hour it was a hard clear resin. The amount of insoluble resin obtained amounted to an 84% yield based upon the amount of itaconic acid and APS used. The resin contined sulfur and phosphorus and would not support a flame. When a piece of the resin was held in an open flame it charred and swelled to about 10 times the volume.

*Example 7*

Reaction of tere-phthalic acid with APS.

Dissolved approximately 3 parts of tere-phthalic acid in warm (40° C.) dimethyl cyanamide, $(CH_3)_2NC{\equiv}N$, then dissolved 3 parts of APS in the warm solution. The solution was then heated on a steam cone in a thin layer in a watch glass. After 40 minutes of heating, a clear, viscous product had formed. After 2 hours of heating at about 80° C. a clear hard and tough polymer had formed. The polymer contained phosphorus and sulfur and was flame resistant. (APS does not react with dimethyl cyanamide.)

*Example 8*

Reaction of stearic acid with APS.

Four parts of stearic acid was dissolved in 35 parts of ethanol and then two parts of APS was dissolved in the ethanolic solution. Five parts of the solution was placed in a watch glass and heated on a steam cone for 1 hour to produce a wax-like polymer. The polymer was insoluble in water and in ethanol. It contained phosphorus and sulfur.

Thirty parts of the above solution was used to wet 8 oz. cotton twill fabric. The fabric was dried at 60° C. then heated 5 minutes at 125° C. The treated fabric was water resistant and contained phosphorus and nitrogen.

We claim:

1. A process for producing flame-proof polymers which comprises mixing an aziridinyl compound selected from the group consisting of a 1-aziridinyl phosphine oxide containing at least two 1-aziridinyl groups, a 1-aziridinyl phosphine sulfide containing at least two 1-aziridinyl groups, and mixtures thereof with a carboxylic acid, the carboxylic acid groups constituting the only groups in said acid reactive with the aziridinyl groups of said aziridinyl compound, and permitting the aziridinyl compound and the acid to react with each other until a polymeric reaction product is produced, the amount of acid varying from about 2% by weight of the aziridinyl compound to such amounts as will provide about one carboxy group per aziridinyl group.

2. The process of claim 1 wherein the mixture reacts at a temperature of about from 10° C. to 150° C.

3. The process of claim 1 wherein the aziridinyl compound is tris (1-aziridinyl) phosphine sulfide and the carboxylic acid is acetic acid.

4. The process of claim 1 wherein the aziridinyl compound is tris(1-aziridinyl) phosphine sulfide and the carboxylic acid is adipic acid.

5. The process of claim 1 wherein the aziridinyl compound is tris (1-aziridinyl) phosphine oxide and the carboxylic acid is adipic acid.

6. The process of claim 1 wherein the aziridinyl compound is tris (1-aziridinyl) phosphine sulfide and the carboxylic acid is succinic acid.

7. The process of claim 1 wherein the aziridinyl compound is tris (1-aziridinyl) phosphine sulfide and the carboxylic acid is itaconic acid.

8. The process of claim 1 wherein the aziridinyl compound is tris (1-aziridinyl) phosphine sulfide and the carboxylic acid is beta-bromopropionic acid.

9. The process of claim 1 wherein the aziridinyl compound is tris(1-aziridinyl) phosphine sulfide and the carboxylic acid is oxalic acid.

10. The process of claim 1 wherein the aziridinyl compound is tris (1-aziridinyl) phosphine sulfide and the carboxylic acid is terephthalic acid.

11. The process of claim 1 wherein the aziridinyl compound is tris (1-aziridinyl) phosphine sulfide and the carboxylic acid is stearic acid.

12. A process for producing flame-proof polymers which comprises mixing an aziridinyl compound selected from the group consisting of a 1-aziridinyl phosphine oxide containing at least two 1-aziridinyl groups, a 1-aziridinyl phosphine sulfide containing at least two 1-aziridinyl groups, and mixtures thereof with a carboxylic acid of the formula $R(COOH)_n$, where $n$ is an integer from 1 to 4 and R is a radical from the group consisting of alkyl and aryl, the carboxylic acid groups constituting the only groups in said acid reactive with the aziridinyl groups of said aziridinyl compound, and permitting the aziridinyl compound and the acid to react with each other until a polymeric reaction product is produced, the amount of acid varying from about 2% by weight of the aziridinyl compound to such amounts as will provide about one carboxy group per aziridinyl group.

13. The process of claim 12 wherein the mixture reacts at a temperature of about from 10° C. to 150° C.

14. A flame-proofing composition comprising a homogeneous liquid comprising the partially polymerized product obtained by mixing an aziridinyl compound selected from the group consisting of a 1-aziridinyl phosphine oxide containing at least two 1-aziridinyl groups, a 1-aziridinyl phosphine sulfide containing at least two 1-aziridinyl groups, and mixtures thereof with a carboxylic acid of the formula $R(COOH)_n$, where $n$ is an integer from 1 to 4 and R is a radical selected from the group consisting of alkyl and aryl, the carboxylic acid groups constituting the only groups in said acid reactive with the aziridinyl groups of said aziridinyl compound, the amount of acid varying from about 2% by weight of the aziridinyl compound to such amounts as will provide about one carboxy group per aziridinyl groups, permitting the aziridinyl compound and the acid to react with each other to produce a polymeric reaction product, and stopping the reaction while the reaction mixture is still a homogeneous liquid and before polymerization has proceeded to the point where the polymer has solidified.

15. A process for rendering a cellulosic fibrous material flame-proof which comprises impregnating a cellulosic fibrous material with the partially polymerized composition of claim 14 and heating the impregnated material to solidify and insolubilize the polymer.

References Cited in the file of this patent

UNITED STATES PATENTS

| 2,606,901 | Parker | Aug. 12, 1952 |
| 2,654,738 | Lecher | Oct. 6, 1953 |
| 2,672,459 | Kuh | Mar. 16, 1954 |
| 2,682,521 | Coover | June 24, 1954 |

FOREIGN PATENTS

| 854,651 | Germany | Nov. 6, 1952 |
| 863,055 | Germany | Jan. 15, 1953 |
| 888,853 | Germany | Sept. 7, 1953 |